United States Patent [19]

Savage

[11] 4,356,859
[45] Nov. 2, 1982

[54] LOST WAX FEEDER AND RUNNER SYSTEMS
[75] Inventor: Philip Savage, Littleover, England
[73] Assignee: Rolls-Royce Limited, London, England
[21] Appl. No.: 225,397
[22] Filed: Jan. 15, 1981
[30] Foreign Application Priority Data
Feb. 12, 1980 [GB] United Kingdom ............... 8004669
[51] Int. Cl.$^3$ .............................................. B22C 7/02
[52] U.S. Cl. .................................. 164/244; 164/246; 164/35
[58] Field of Search ................... 164/6, 244, 246, 34, 164/35, 36

[56] References Cited
U.S. PATENT DOCUMENTS
2,994,931  8/1961  Operhall ............................ 22/158
3,598,167  8/1971  Snyderman ........................ 164/26
4,240,493  12/1980  Wilmarth ........................... 164/35

Primary Examiner—Nicholas P. Godici
Assistant Examiner—Richard K. Seidel

[57] ABSTRACT

A wax pattern and runner assembly includes resilient means whereby upon expansion of the wax upon removal from a ceramic mould the resilient means are compressed.

5 Claims, 3 Drawing Figures

LOST WAX FEEDER AND RUNNER SYSTEMS

This invention relates to making castings including disposable feeders and runners made by the lost wax casting process.

It is at present well known to manufacture castings to extremely close tolerances by the lost wax casting process. The process essentially consists of producing a disposable wax pattern within a mould or die: removing the wax pattern from the die and coating it with a layer or layers of ceramic material to form a mould. The ceramic material is then dried and later heated such that the wax is melted out or, burned off to define a casting cavity and runner system. The ceramic material is then fired to complete the mould.

Such a method of manufacturing moulds usually results in the production of nearly identical castings to close tolerances, and for this reason the process has been used extensively to manufacture blades for gas turbine engines and many other precision components.

It is well known that the process suffers a particular disadvantage in that when the ceramic coated wax is heated to remove the wax, the wax expands at a greater rate than the adjacent ceramic material. As a result of this the ceramic material sometimes cracks and so the mould becomes useless.

A well known method of partially alleviating the problem is to carry out the heating of the ceramic covered wax in a steam oven whose temperature is carefully controlled. In this way it is possible to ensure that the outer surfaces of the wax are melted preferentially. The preferentially melted wax may therefore flow from the ceramic mould and therefore allow space for the remainder of the wax to expand within the mould and then assist in reducing the possibility of cracking of the ceramic occurring.

However, this method of wax removal does not entirely eliminate the problem of cracked moulds particularly for example in the case of moulds requiring relatively long runner systems. In this case the outer surface of the wax is still melted preferentially. However, it is believed that due to the distance which the molten wax has to travel prior to removal from the mould the ceramic is cracked by the hydraulic effect of the molten wax acting upon the adjacent ceramic material.

An object of the present invention is to substantially eliminate the aforementioned problem.

According to the present invention, a wax pattern for use in the investment casting process includes at least one runner, and at least one resilient portion.

Preferably at least one resilient portion is included within or upon the runner.

The (at least one) resilient portion may be secured to the outer surface of the runner, or within a depression or pocket upon the outer surface thereof.

Alternatively the at least one resilient portion is secured within the runner during its manufacture.

Preferably, the at least one resilient portion comprises a strip of expanded polystyrene foam.

A wax pattern and runner including resilient means is found, which means are compressed upon expansion of the wax pattern when the wax is being removed from a ceramic mould.

For better understanding thereof, an embodiment of the invention will now be more particularly described by way of example only and with reference to the accompanying drawings in which.

Figure 1:
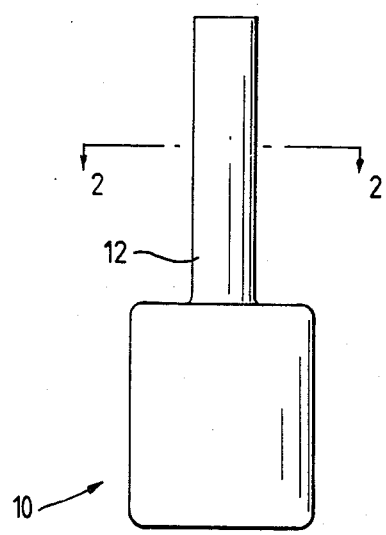
FIG. 1 shows a pictorial view of a simplified wax pattern and runner.
Figure 2:
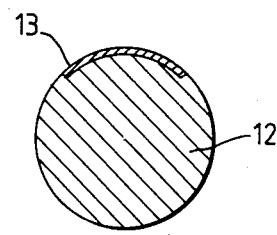
FIGS. 2 and 3 show cross-sectional views taken at line 2—2 on FIG. 1 of two different embodiments of the present invention.
Figure 3:
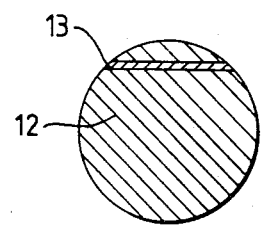

Referring to the drawings, a wax pattern and runner assembly comprises a wax pattern shown generally at 10 and a wax runner 12. As can be seen from FIGS. 2 and 3 of the drawings, a resilient portion 13 is located upon or within the runner 12.

The resilient portion 13 may comprise a strip of suitably shaped foamed polystyrene made by any conventional method for making such a substance. Alternatively, the resilient member may be made from any suitable resilient material. A suitable material is one which may be either vaporized or burned off when the wax pattern and runner are removed from the ceramic mould within which they are encapsulated. Polystyrene is particularly suitable as it has a relatively low ash content and any remaining debris may be conveniently filtered from the molten wax, if it is considered desirable to reclaim it.

The resilient member may be cast into the runner during the wax injection of the runner and pattern within the die. Alternatively, the resilient member may be secured upon the surface of the runner or alternatively secured within a pocket provided within the surface of the runner. The resilient member may be conveniently secured to the runner by means of double sided adhesive tape.

It will be appreciated that by providing the resilient portion 13 within the runner, when the runner expands upon being melted such that it may be removed from the ceramic shell, such expansion is absorbed by the resilient portion 13, thus preventing cracking of the ceramic mould.

It will be readily appreciated by those skilled in the art that although this invention has been particularly directed to the resilient portion being secured to the runner, it is also contemplated that there may be occasions which would necessitate the resilient material being secured to the wax pattern. However, it is not considered to be desirable to secure the resilient member to the wax pattern if it can be avoided as it would obviously effect the dimensions and surface finish of the completed casting.

I claim:

1. A wax pattern and runner including crushable means, which means are compressed upon thermal expansion of the wax pattern and runner when the wax is heated and removed from a ceramic mould.

2. A wax pattern as claimed in claim 1 in which the at least one crushable portion is included upon or within the runner.

3. A wax pattern as claimed in claim 1 in which the at least one crushable portion is secured to the outer surface of the runner, or within a depression or pocket upon the surface thereof.

4. A wax pattern as claimed in claim 1 in which the at least one crushable portion is secured within the runner during its manufacture.

5. A wax pattern as claimed in claim 1 in which the at least one crushable portion comprises a strip of expanded polystyrene foam.

* * * * *